Jan. 25, 1927.

T. MIDGLEY

TIRE MOLD

Filed April 2, 1924    2 Sheets-Sheet 1

1,615,470

INVENTOR.
Thomas Midgley
BY
ATTORNEY.

Jan. 25, 1927.
T. MIDGLEY
1,615,470
TIRE MOLD
Filed April 2, 1924  2 Sheets-Sheet 2
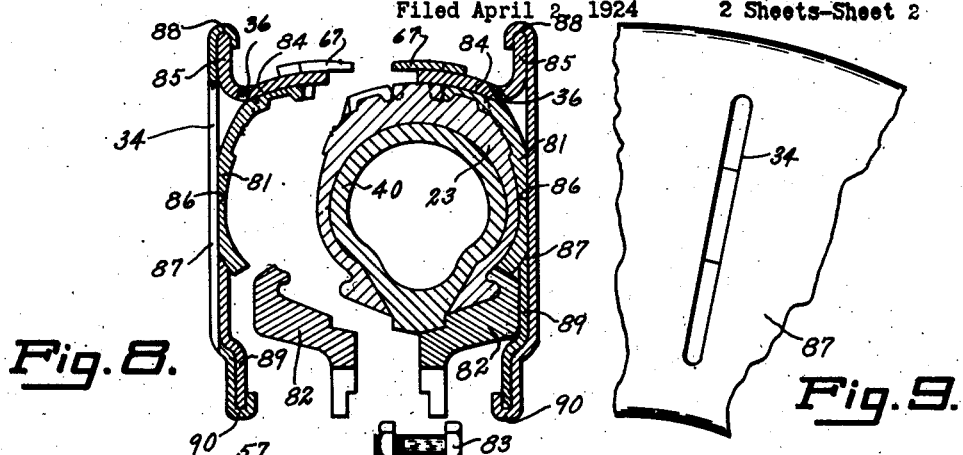

Patented Jan. 25, 1927.

1,615,470

UNITED STATES PATENT OFFICE.

THOMAS MIDGLEY, OF HAMPDEN, MASSACHUSETTS, ASSIGNOR TO THE FISK RUBBER COMPANY, OF CHICOPEE FALLS, MASSACHUSETTS, A CORPORATION OF MASSACHUSETTS.

TIRE MOLD.

Application filed April 2, 1924. Serial No. 703,578.

In one manner of vulcanizing tire casings they are enclosed between the halves of circumferentially split molds which are stacked one upon another and held closed against the expansive force of fluid pressure or the resistance of a rigid core by a hydraulic ram. The molds heretofore used for this purpose have been made of cast iron, or cast or forged steel. The present invention relates to molds adapted for use in this old manner but constructed out of sheet metal. The main objects are the incorporation by suitable design in a sheet steel mold of a sufficient amount of the strength and rigidity of the former solid metal molds, and of their adaptability for use in the present type of heater and on horizontal loading and unloading conveyors, with the lightness and low steam consumption of sheet metal construction. The invention involves certain broad conceptions and additional details of construction which will be pointed out below.

Referring now to the drawings, in which molds constructed according to my invention will be described in several embodiments, Fig. 1 is a section, with one mold half removed, and Fig. 2 is a fragmentary side elevation, of one form of mold constructed according to the principles of my invention;

Figs. 8 and 9 are similar views of a fifth variation;

Figs. 10 and 11 are similar views of a sixth variation;

Figs. 12 and 13 are similar views of a seventh variation; and

Fig. 14 is a perspective of one form of clip used in holding the bead rings together.

The several variant types of molds hereinafter to be described have certain characteristics in common by which, although constructed of sheet metal, they are adapted to replace the heavy metal molds formerly in use. In all, the side of the tire is molded by side plates of substantially uniform thickness, curved to tire shape. The tread pattern is molded on the tire in some variants by a portion of the side wall formed in the reverse of the pattern desired, while in others it is formed by a separate piece attached to the side wall. In the preferred cases these tread molding portions are in practical effect continuations of the side walls and of a thickness substantially uniform with the walls. Due to the depth of the pattern the apparent thickness is greater in these tread molding portions, but the effective thickness—the distance the heat must travel to reach the rubber—is substantially the same as in the main part of the side walls. The side plates in each of the illustrated cases has secured to it by suitable means bearing members upon which successive molds may be piled one on another in a stack, and through which the lateral pressure serving to keep the molds closed may be transmitted. These members, and their supporting means, are preferably arranged as a perforate frame surrounding the side plates, protecting the latter and receiving the lateral pressure and yet permitting the atmosphere of steam in which the stack of molds is immersed to reach and contact directly with the uniform walled side plates. The individual variant forms will now be described with particular reference to their own constructional details.

Figure 1:
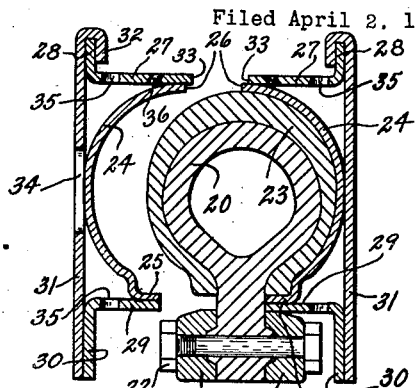
Figure 2:
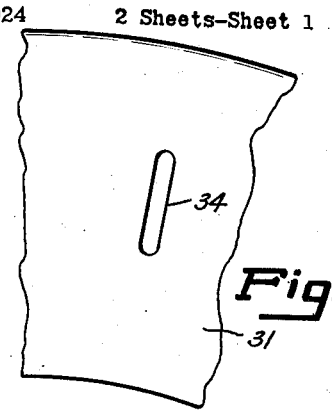

In Figs. 1 and 2 is shown a mold adapted for curing a plain tread tire on a rigid core. The core 20 is made sectional if desired in any of the usual ways, the type shown being held together by binder rings 21 and bolts 22. The tire 23 is built or placed on the core in any desired way. The side plates 24 are in this case formed with flanges 25 adapted to underlie the tire bead edges, and, there being no tread design, extend so as to meet at the parting line 26 of the mold. Secured to the outer periphery of the side plates as by spot welding or brazing are rings 27, turned outwardly to form flanges 28. At the inner periphery of the side plates rings 29, having inwardly projecting flanges 30, are secured to the inturned portions 25 in a similar manner. Bridging the space between flanges 28 and 30 are annular plates 31, shown as secured in place by spot welding or brazing (and by folding at 32 if desired) to flange 28. This structure forms a frame enclosing the outside surface of the side plates and carrying the pressure exerted by the hydraulic ram used in keeping the molds closed. The pair of rings 27 are arranged to abut each other slightly to one side of the parting line of the mold, so that interfitting shoulders 33 are formed which assist in the registration of the mold. Rings 29 abut the shank of the core 20, which takes and transmits the ram pressure. By this construction the side plates are relieved of all crushing strain, being tensioned around the tire by the pressure of the rings 27 and 29 at their outer and inner peripheries, so that they are in tension rather than in compression and are not subject to buckling, a condition of importance in thin-walled sheet metal molds.

The frame formed by plate 31 and rings 27 and 29 is made perforate in order to permit direct access of steam to the side plates. In the present case this is accomplished by slits 34 (Fig. 2) cut in plates 31 at intervals, and holes 35 in rings 27 and 29. The transverse planes on which the right and left hand halves of Fig. 1, and similar views of later modifications, are taken are different so that while one half shows a slot 34, the other does not. In the form shown the flat plates 31 contact with the wide point of the side plates, and may be spot welded or brazed in place. This construction gives a very rigid mold, the plate 31, the rings 27 and 29, and the side plates 23 forming a truss work by which the strain exerted by the press ram is taken up and distributed through the mold without buckling strains being created. Each of these parts, through their combined action, receives its share of the load, and the mold as a whole can stand a mold pressure greater than the allowable load for any of the parts individually.

If desired, however, the plates 31 may be separated from the side plates by increasing the width of rings 27 and 29, although the additional strength of the preferred construction will not be attained. In that case the space within each frame will be single, instead of being divided into two as in the illustrated form. These remarks apply equally to the other variants described below. In the form of Fig. 1, as well as in the others to be described, pocketing of water of condensation is avoided by holes 36 drilled at intervals around the mold along lines where such pockets would otherwise exist.

Figure 3:
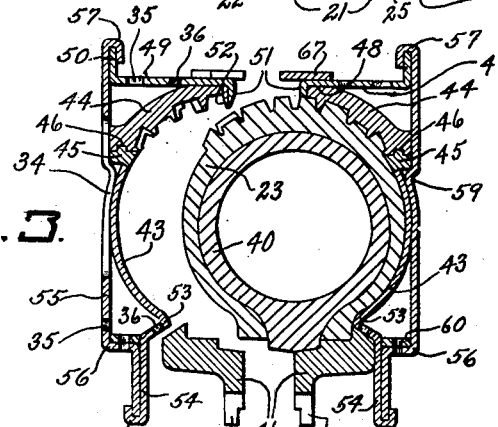
Figs. 3 and 4 are similar views of a second variation.
Figure 4:
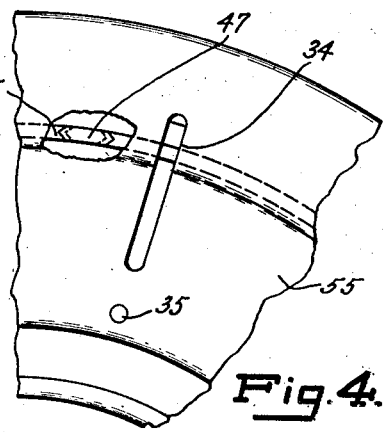

The form of mold shown in Figs. 3 and 4 is adapted for tires having a molded tread pattern and vulcanized under the expansive force of a fluid pressure bag 40. The base of the bag and the bead edges of the tire are shown as confined by bead rings 41 of the usual type, which may be secured together by bolts fitting in slots 42. The sheet metal portion 43 of the side plates extends only up to the tread pattern, the pattern itself being impressed upon the tire by suitably machined castings 44. Since sheet steel cannot be welded to cast iron in a satisfactory way, I have shown the junction between the steel and iron portions as secured through a split ring 45 having a tongue and groove connection 46 with the iron part 44. When the ring is expanded into place it is held by a wedge piece 47 (Fig. 4) and the sheet metal plate 43 is welded or otherwise permanently secured to it. This construction makes a firm union between all the parts mentioned.

The outer surfaces of pieces 44 are machined off at 48 to receive rings 49 having outwardly projecting flanges 50. The rings 49 are turned inwardly so as to form flanges 51 meeting at the parting line of the mold and suitably shaped to form a part of the molding pattern. In the case shown the pattern necessitated a thinner construction at the edge of the left hand member 44 than is suitable for cast iron, and an insert piece of steel 52 has been shown to fill out the pattern at this point. The sheet metal side plates 43 have an angular bend 53 shaped to abut the outer surface of the bead rings 41, and then extend parallel with the plane of the tire to form prying flanges 54. Plates 55 extend from the flanges 50 to the flanges 54, being bent at 56 to shift from one plane to the other, are secured to flange 50 by being folded at 57 around it, and secured to flange 54 by that flange being folded at 58 around the plate. At 59 a slight bend in this plane is shown accommodating it to the curvature of the sheet metal plates 43, to which the plates 55 are preferably spot welded or brazed. A ring 60 has been shown reinforcing the mold adjacent the bend 56, this ring being riveted or spot welded to the plate 55. The slots 34, holes 35, and drain holes 36, are provided in this case in a manner similar to that in the form shown in Fig. 1.

Figure 7:
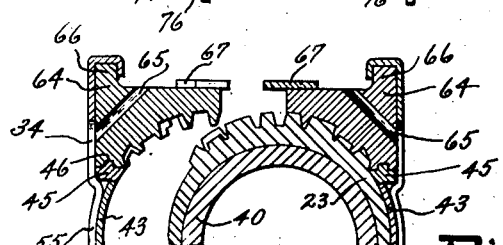
Fig. 7 is a fragmentary view of a fourth variation which may be similar, except as shown, to Fig. 5.

In Fig. 7 a construction is shown in which the members 44 of the type just described are replaced by more bulky castings 64. These castings take the place of both the members 44 and the rings 49, and are preferably drilled at 65 for steam circulation and drainage. These castings are secured by rings 45 to side plates 43 in a manner similar to that previously described, and plates 55 are attached by bending around lugs 66 on the castings, likewise in a similar manner. In this and other cases registration of the mold halves may be secured by plates or rings 67 secured to the periphery of the mold and having interfitting portions causing the mold halves to register when they are pressed together. This construction is desirable when a tread pattern is used, but is not necessary in the case shown in Fig. 1. The construction shown in Fig. 7 may be completed at the inner circumference in the same manner as the variant shown in Fig. 3, or in a manner illustrated in any of the other figures.

Figure 5:
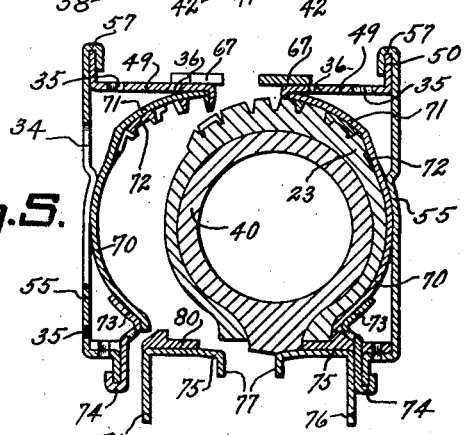
Figs. 5 and 6 are similar views of a third variation.
Figure 6:
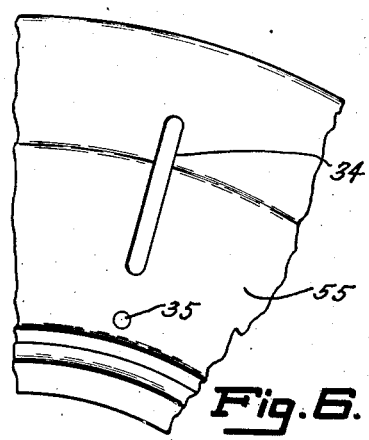

In the variant shown in Figs. 5 and 6, several changes of construction have been made over the forms previously described, and only these changes will be noted. The side plates 70 have recessed portions 71 which receive a tread molding strip formed preferably of a punched sheet metal strip welded or brazed in place. The side plates 70 furnish the backing for the holes in the strip 72 so that the two together form the molding pattern in a manner described in my prior application Serial No. 659,813, filed August 28, 1923. Instead of extending inwardly in flanges 54 as in the earlier described case, the side plates in this embodiment terminate adjacent the bead of the tire and have brazed or welded thereto rings 73 which are folded at 74 around the inwardly extending portions of plates 55, which are constructed in a similar manner to that earlier discussed. Another change made in this form is in the structure of the bead rings. Instead of being of the usual type made of castings, they are shown here as being constructed of sheet metal. Rings 75 are provided with inwardly bent flanges 76 and 77, the former serving as prying flanges for separating the molds, and the latter as retaining flanges for holding the bead rings assembled. A convenient manner of holding the bead rings assembled is by a clip 78 illustrated in Fig. 14, being of U-shaped cross section with a pivot 79 adapted to be secured to one of the flanges 77. By rotating this clip about its pivot its U-shaped portion can be caused to embrace the two flanges 77 when these are brought into adjacency, or can be swung to release the flanges and permit the bead rings to be separated. On the outer surface of rings 75 are rings 80, suitably formed as shown to receive the bead edges of the tire. These rings may be secured to the rings 75 by spot welding, riveting, or brazing, and may be formed by rolling a steel band or by any other suitable method.

In the variant shown in Figs. 8 and 9 the side plates 81 are made heavy enough so that the tread pattern can be formed in them, and terminate slightly short of the bead edges of the tire in adjacency to bead rings 82 of the usual construction, which are held together by bolts 83. Secured to the side plates at their outer peripheries, and forming a backing for any holes punched through the side plates to form the molding pattern according to the disclosure in my said application Serial No. 659,813, filed August 28, 1923, are rings 84 bent outwardly into flanges 85. The side plates are machined flat at 86 to receive plates 87, which may be spot welded or brazed to them and which are folded at 88 around the flanges 85. Additional plates 89 reinforce the plates 87 at their inner portions, and abut the side plates in a manner indicated. These plates press, when the mold is assembled, against the flat sides of the bead rings 82, and may be held to the plates 87 by brazing or spot welding and in addition by a fold 90 of the latter plates around them.

In the variant shown in Fig. 10 the structure is quite similar to that shown in Fig. 5 with the exception that the side plate 91 is formed in this instance with a thickened portion 92, in which the tread molding pattern is impressed. The side plates are preferably made of a material in which a sharp impression may be formed by molding, but if desired the tread pattern may be machined into the thickened portion of the side plate. Another difference in method of construction of this type resides in the fact that the side plate instead of terminating before the heel of the bead, is bent backward similarly to the side plate 43 in Fig. 3, and is pinned or otherwise secured at 93 to a short piece 94 corresponding except in height to the piece 73 of Fig. 5. The remaining parts are constructed in a manner similar to that indicated in Fig. 5, and are designated by the same numerals.

Another quite similar form of mold is shown in Figs. 12 and 13. The main feature of difference lies in the substitution of other fastening means for the pin 93 of the variant. This pin was made necessary by a difference in the materials of which the side plate 91 and the member 94 were constructed so that welding was impractical. In the structure shown in Fig. 12, an annular clip 97 is substituted for the member 94. This clip is folded tightly around both the inner circumference of the side plate 91, and the inner circumference of the plate 55. If this clip is tightly folded around these parts, no other securing means is necessary. It is desirable in both of these cases to provide spacing members 98 at the bend in the plate 55 as indicated in order to give additional strength at this point.

While I have indicated several forms of mold, and have pointed out in detail their constructional characteristics, it will be understood that these characteristics may be varied and different combinations of the constructional features described may be made without departing from the invention as set forth in the accompanying claims.

Having thus described my invention, I claim:

1. A mold adapted for use in the vulcanization of tire casings, having side plates of substantially uniform thickness, curved to the shape of the tires, and bearing members spaced in part from the side plates but attached thereto at both the inner and outer peripheries of the mold and presenting surfaces upon which pressure may be received and transmitted through the mold without buckling.

2. A mold adapted for use in the vulcanization of tire casings, having side plates of substantially uniform thickness, curved to the shape of the tire, and carried by an enclosing frame presenting substantially flat surfaces extending parallel to the plane of the tire, upon which surfaces adjacent molds may rest when stacked one upon another, said frame being made perforate so as to permit an enveloping atmosphere of steam to have free access to the side plates.

3. A mold adapted for use in the vulcanization of tire casings, having side plates of substantially uniform thickness, curved to the shape of the tire, and substantially flat plates attached to the side plates at about the outermost part of their curvature and extending parallel to the plane of the mold so as to be spaced from the side plates; said flat plates serving as supports for the molds when stacked one over another.

4. A mold adapted for use in the vulcanization of tire casings, having side plates of substantially uniform thickness, curved to the shape of the tire, substantially flat plates attached to the side plates at about the widest part of the mold and extending parallel to the plane of the mold so as to be spaced from the side plates, said flat plates serving as supports for the molds when stacked one over another, and additional devices for transmitting through the mold without distorting the side plates the lateral pressure used in holding the molds assembled.

5. A mold adapted for use in the vulcanization of tire casings, having side plates of substantially uniform thickness, curved to the shape of the tire, and an open frame permanently attached to each side plate and forming therewith an annular truss work imparting rigidity to the mold and capable of transmitting lateral pressure without distorting the curved side plates.

THOMAS MIDGLEY.